(No Model.) 2 Sheets—Sheet 1.
J. F. REHM.
FRUIT CUTTING AND PITTING MACHINE.
No. 517,588. Patented Apr. 3, 1894.
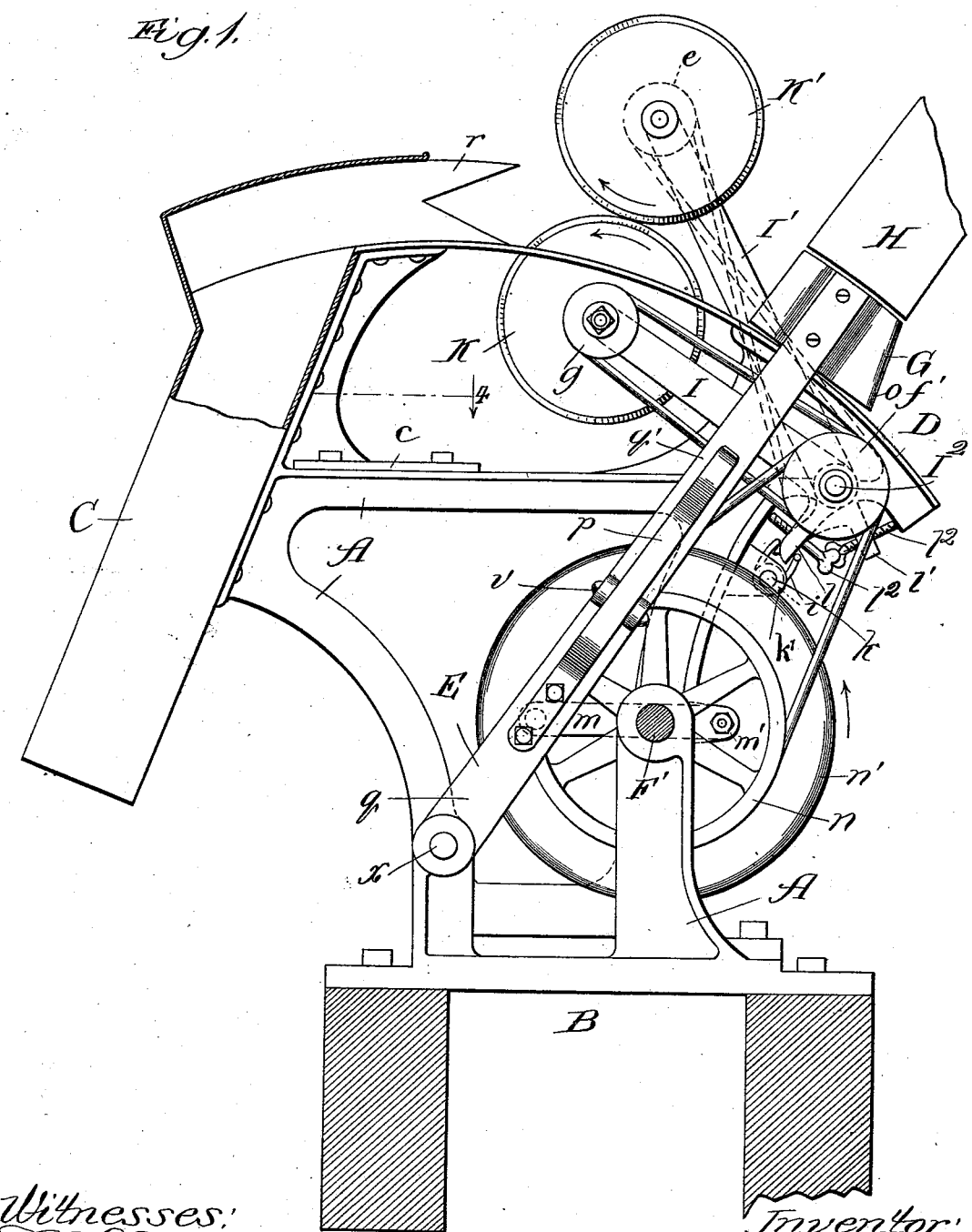
Witnesses:
Chas. E. Gaylord
W. N. Williams
Inventor:
Jacob F. Rehm,
By Dyrenforth & Dyrenforth
Attys.
THE NATIONAL LITHOGRAPHING COMPANY,
WASHINGTON, D. C.

(No Model.) 2 Sheets—Sheet 2.
J. F. REHM.
FRUIT CUTTING AND PITTING MACHINE.
No. 517,588. Patented Apr. 3, 1894.
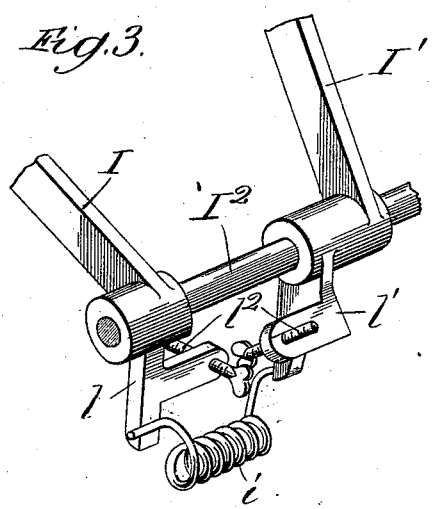
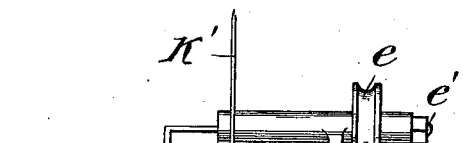
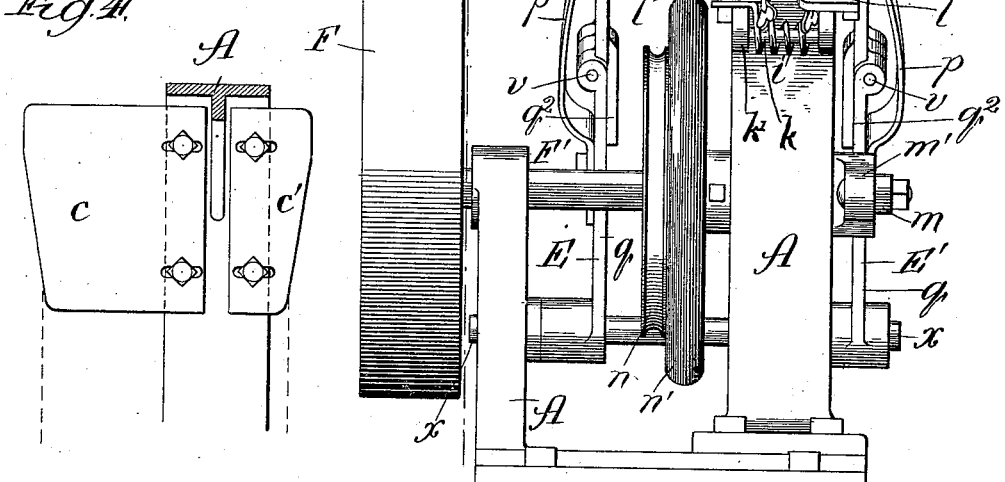
Witnesses:
Chas. E. Gaylord
W. N. Williams
Inventor:
Jacob F. Rehm,
By Dyrenforth & Dyrenforth
Attys

UNITED STATES PATENT OFFICE.

JACOB F. REHM, OF CHICAGO, ILLINOIS.

FRUIT CUTTING AND PITTING MACHINE.

SPECIFICATION forming part of Letters Patent No. 517,588, dated April 3, 1894.

Application filed October 18, 1893. Serial No. 488,465. (No model.)

*To all whom it may concern:*

Be it known that I, JACOB F. REHM, a citizen of the United States, residing at Chicago, in the county of Cook and State of Illinois, have invented a new and useful Improvement in Fruit Cutting and Pitting Machines, of which the following is a specification.

The object of my invention is to provide a machine for cutting into sections, preparatory to desiccation, fruit of the kind containing a hard kernel, such as the apricot, peach, plum, and the like, and at the same time pitting the fruit.

Referring to the accompanying drawings—Figure 1 shows my improved machine by a view in broken sectional side elevation, the section being taken at the line 1 on Fig. 2 and viewed in the direction of the arrow. Fig. 2 is a front view of the machine. Fig. 3 is a broken perspective view showing the controlling means for the yielding cutter carrying arms. Fig. 4 is a broken plan view in section taken at the line 4 on Fig. 1 and viewed in the direction of the arrow.

Generally stated, my improved machine involves a divided holder, to which the fruit is fed, and which is oscillated, or otherwise carried, across cutting means which effect sectioning of the fruit and opening thereof to the pit, which is dislodged and forced out by impingement against a stop encountered in the movement of the holder, while the latter proceeds on its forward course to drop the fruit-sections preparatory to returning to the feed for another supply.

A is the frame of the machine supported on a suitable bed B, and which carries all of the operating parts hereinafter described. To one (the delivery) side of the frame is fastened a hooded chute C to which leads a way D formed in the arc of a circle having as its center the rock-shaft $x$ journaled in suitable bearings on the frame; and from the center of the mouth of the chute there extends lengthwise of the center of the way D, for a short distance along it, a stop $r$, shown as a sheet-metal projection having a V-shaped recess cut into it from its forward end. To the pivot center $x$, at opposite sides of the machine, are secured to rock with it arms E and E', each formed in two sections $q$ and $q'$ hinged together at $v$, the upper section $q'$ having a stop-finger $q^2$ to overlap the lower section to prevent yielding of the section $q'$ in the direction of pressure of the controlling spring $p$ beyond a perpendicular position. At $t$ the upper section of the arm E is bent inward at a right-angle to bring it close to the way D; and the two arms E and E', where they flank the said way, terminate at their upper ends in bottomless, laterally concavo-convex, heads $o$ and $o'$, which should have the somewhat tapering form illustrated, and which, together, afford a laterally expansible and contractible holder G for the fruit to be operated on.

F is the drive-pulley on a shaft F' journaled in bearings on the frame and carrying between its journals a belt-pulley $n$ and fly-wheel $n'$; and on one end of the shaft F' is a crank $m'$ connected by a link $m$ with the arm E'. Thus, as will be seen, rotation of the pulley-shaft oscillates the arms E and E' to carry the divided holder G back and forth between a feed H and the hood of the chute C.

I and I' are cutter-carrying arms journaled to permit them to be oscillated independently on opposite ends of a rotary shaft I$^2$ journaled in the forward part of the frame above the shaft F'. From the journals of the arms depend bearings $l$ and $l'$ carrying set-screw stops $l^2$, one extending into position to abut against the under side of the way D and the other to abut against the adjacent part of the frame A; and on a rod $k$, supported at its opposite ends by bearings $k'$ on the frame is a helical spring $i$, the free ends of which press in opposite directions respectively against the depending portions of the bearings $l$, $l'$. On the upper ends of the arms I and I' are journaled circular cutters K and K', the former projecting upward through a longitudinal slot $h$ in the way D into desirably close normal proximity to the upper cutter K', the cutters being in the same vertical plane. As will be seen, the stops $l^2$ prevent the approach toward each other of the cutters beyond desired proximity, or degree of contact; while the spring $i$ permits the arms and, accordingly, the cutters carried by them, to be forced apart, and operates to return them to their normal relative positions when released from the cause of their separation, which may be and preferably is merely the pit in the fruit undergoing the cutting operation.

To cause desired rotation of the cutters, I connect one (K) from a pulley $g$ on its rotary shaft $g'$, with a pulley $f$ on the adjacent end of the shaft $I^2$, carrying a driving-pulley $f'$ connected with the pulley $n$ on the shaft $F'$; and I connect the other (K') from a pulley $e$ on its rotary shaft $e'$, with a pulley $d$ on the adjacent end of the shaft $I^2$.

The operation of the machine is as follows: As shown, the relative positions of the parts are such as to permit the fruit (as a peach) to be fed into the holder G. The rotation of the shaft, while causing, through the described connections therewith, rapid rotation of the cutters in the directions indicated by arrows, also, through the crank and link connection of the shaft $F'$ with the arm $E'$, advances the arms E and $E'$, and with them the divided holder G along the way D between the cutters to the mouth of the chute C. The fruit is cut by thus feeding it against the cutters, which enters the holder between its sections, the depth of the cut extending to the pit, the resistance of which to the cutters spreads them apart, by forcing the arms I and $I'$ in opposition to the spring, to let the pit pass the cutters. On passing the cutters the holder carries the severed peach and its pit, along the way D, to the stop $r$, which arrests the pit while the sections of the holder carry the divided fruit forward past the pit, (which is thus forced out by the stop $r$) beyond the way D to the chute C, into which the fruit-sections are dropped.

In order to facilitate the forcing action of arresting the pit, and to prevent any tendency of its dislodgement to tear the meat, I prefer to effect the spreading apart of the arms E and $E'$ to open or separate the holder-sections (instead of depending therefor alone on the dislodgement of the pit) by means of cams $c$ and $c'$ supported on the frame A in the paths of the said arms. The location of these cams, which should be adjustable, as indicated, for variation in the diameter of the fruit, is such as to cause them to be engaged by the inner surfaces of the upper, resilient sections of the arms throughout the dislodging action of the stop $r$ on the pit. When the holder has reached the end of its forward throw toward the chute C, the continued rotation of the pulley $n$ returns it to the feed H for another peach, to be acted on as described.

The particular construction shown and described of my machine is believed best to adapt it for its purpose. It may be variously modified, however, without materially, if at all, impairing its function and without departing from my invention. Hence I do not limit my invention to the exact details.

What I claim as new, and desire to secure by Letters Patent, is—

1. In a fruit-cutting and pitting machine, the combination with the frame of a cutter, a pit-dislodging stop in the path of the fruit across said cutter, and a divided fruit-holder reciprocally connected with the driving shaft to be carried by the operation of the machine back and forth across the cutter to engage the pit with the stop, substantially as and for the purpose set forth.

2. In a fruit-cutting and pitting machine, the combination with the frame of a pair of rotary cutters yieldingly supported with relation to each other to extend into the path of the fruit, a pit-dislodging stop in the path of the fruit across the cutters, and a divided fruit-holder reciprocally connected with the driving shaft to be carried by the operation of the machine back and forth across the cutters to engage the pit with the stop, substantially as and for the purpose set forth.

3. In a fruit cutting and pitting machine, the combination with the frame of an arc-shaped way, a pit-dislodging stop near one end of the way, a bottomless divided fruit-holder reciprocally connected with the driving shaft to be oscillated on said way by the operation of the machine back and forth with relation to the stop, and a pair of rotary cutters yieldingly supported with relation to each other, in the path of the fruit, to the stop, with the lower cutter projecting upward through said way, substantially as and for the purpose set forth.

4. In a fruit cutting and pitting machine, the combination with the frame of an arc-shaped way, a pit-dislodging stop near one end of the way, spring-controlled arms supported to oscillate at opposite sides of said way and each carrying a section of a divided bottomless fruit-holder extending over said way, and a pair of rotary cutters yieldingly supported with relation to each other in the path of the fruit to the stop, substantially as and for the purpose set forth.

5. In a fruit cutting and pitting machine, the combination with the frame of an arc-shaped way, a pit-dislodging stop near one end of the way, spring-controlled arms supported to oscillate at opposite sides of said way and each carrying a section of a divided bottomless fruit-holder extending over said way, a cam in the path of said arms, and a pair of rotary cutters yieldingly supported with relation to each other in the path of the fruit to the stop, substantially as and for the purpose set forth.

6. A fruit cutting and pitting machine comprising, in combination with a frame A, an arc-shaped way D, a rotary driving shaft $F'$, pivotal arms E and $E'$ connected with said shaft to be oscillated by its rotation, and having spring-controlled sections, a holder G formed in sections supported on said arms over the way D, pivotal cutter-arms I and $I'$ carrying rotary cutters K and K' geared with the said shaft, said cutter-arms having stops at their rear ends, a spring $i$ engaging the cutter-arms and against which they are separated, and a chute C at the discharge end of said way and having a pit-dislodging stop $r$ extending into the path of the fruit in the holder, the whole being constructed and arranged to operate substantially as described.

JACOB F. REHM.

In presence of—
M. J. FROST,
W. N. WILLIAMS.